United States Patent
Park (10) Patent No.: US 8,879,587 B2
(45) Date of Patent: Nov. 4, 2014

(54) METHOD AND APPARATUS FOR COAXIAL CABLE BASED BROADCAST AND COMMUNICATION CONVERGENCE IN HOME NETWORK

(75) Inventor: Wan Ki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 592 days.

(21) Appl. No.: 12/970,266

(22) Filed: Dec. 16, 2010

(65) Prior Publication Data

US 2011/0150056 A1   Jun. 23, 2011

(30) Foreign Application Priority Data

Dec. 21, 2009   (KR) .................. 10-2009-0127710

(51) Int. Cl.
*H04J 3/04*   (2006.01)
*H04B 3/50*   (2006.01)

(52) U.S. Cl.
CPC ..................................... *H04B 3/50* (2013.01)
USPC ....................................................... 370/535

(58) Field of Classification Search
None
See application file for complete search history.

(56) References Cited

U.S. PATENT DOCUMENTS

| 8,391,316 B2* | 3/2013 | Gorostegui et al. ........... 370/487 |
| 8,397,271 B2* | 3/2013 | Riggsby ........................ 725/149 |
| 2004/0161236 A1* | 8/2004 | Koh et al. ..................... 398/75 |
| 2004/0255332 A1 | 12/2004 | Bertonis et al. |
| 2005/0025485 A1* | 2/2005 | Lee et al. ..................... 398/71 |
| 2007/0229231 A1* | 10/2007 | Hurwitz et al. .......... 340/310.11 |
| 2008/0204112 A1 | 8/2008 | Chung et al. |
| 2009/0165070 A1* | 6/2009 | McMullin et al. ............. 725/125 |

FOREIGN PATENT DOCUMENTS

| JP | 2000-115227 | 4/2000 |
| JP | 2003-69494 | 3/2003 |
| KR | 10-2008-0071667 | 8/2008 |
| KR | 10-2008-0082816 | 9/2008 |
| KR | 10-2009-0067113 | 6/2009 |

* cited by examiner

*Primary Examiner* — Minh-Trang Nguyen
(74) *Attorney, Agent, or Firm* — Staas & Halsey LLP (57) ABSTRACT

Disclosed are a method and an apparatus for a coaxial cable based broadcast and communication convergence in a home network for supporting a frequency band less than a frequency band used in Multimedia over Coax Alliance (MoCA). The apparatus for broadcast and communication convergence includes a broadcast processor that transmits and receives broadcast signals from an external broadcasting network; a communication processor that transmits and receives communication signals from an external communication network; and a broadcast and communication converging unit that is operated as a terminal for the broadcast signals input to the broadcast processor and the communication signals input to the communication processor, and divides an occupied frequency band of the broadcast signals from a remaining frequency band, and uses the remaining frequency band as a channel for the communication signals.

13 Claims, 7 Drawing Sheets

FIG 6

METHOD AND APPARATUS FOR COAXIAL CABLE BASED BROADCAST AND COMMUNICATION CONVERGENCE IN HOME NETWORK

CROSS-REFERENCE TO RELATED APPLICATIONS

This application claims priority under 35 U.S.C. §119 to Korean Patent Application No. 10-2009-0127710, filed on Dec. 21, 2009, in the Korean Intellectual Property Office, the disclosure of which is incorporated herein by reference in its entirety.

BACKGROUND OF THE INVENTION

1. Field of the Invention

The present invention relates to a method and an apparatus for a broadcast and communication convergence in a home network by using a coaxial cable for a broadcast that does not support a frequency band of Multimedia over Coax Alliance (MoCA).

2. Description of the Related Art

Generally, a coaxial cable is installed in modern houses including apartments as a broadcast network environment for watching terrestrial or cable television. Further, a technology capable of converging in-home broadcast and communication using the coaxial cable has been proposed. One of the technologies is called a Multimedia over Coax Alliance (MoCA).

The MoCA, which is a standard for home entertainment network that transmits and distributes multimedia contents and data over residential coaxial cable, uses a frequency band of 870 MHz to 1.6 GHz. Currently, a frequency band of 870 MHz or less is used in an existing broadcast service.

However, the coaxial cable currently installed in a home environment such as most apartments does not meet the standard for signal transfer characteristics required in 870 MHz to 1.6 GHz band used in the MoCA technology. In addition, a standard for a home network configuration in current domestic construction fields does not support the frequency band of the MoCA.

Therefore, in order to support the MoCA technology in an existing home environment, a new coaxial cable meeting a high standard should be installed again. However, removing the existing coaxial cable and installing a new high-band supporting coaxial cable is not easy both physically and economically.

SUMMARY OF THE INVENTION

It is an object of the present invention to provide a multifunction home gateway for a home area network capable of transmitting and receiving signals for broadcast and signals for communication through one existing coaxial cable that does not support a frequency band of a MoCA.

In other words, the present invention provides a method and an apparatus for a broadcast and communication convergence in a home network using one coaxial cable that is installed in a home to receive the existing broadcast but does not support the frequency band of the MoCA In order to solve the technical problems, according to an exemplary embodiment of the present invention, there is provided an apparatus for coaxial cable based broadcast and communication convergence in a home for supporting a frequency band less than a frequency band used in Multimedia over Coax Alliance (MoCA), including: a broadcast processor that transmits and receives broadcast signals from an external broadcasting network; a communication processor that transmits and receives communication signals from an external communication network; and a broadcast and communication converging unit that is operated as a terminal for the broadcast signals input to the broadcast processor and the communication signal input to the communication processor, and divides an occupied frequency band of the broadcast signal from a remaining frequency band, and uses the remaining frequency band as a channel for the communication signals.

The apparatus for coaxial cable based broadcast and communication convergence in a home may further include a data communication processor that transmits and receives data communication signals from an external data communication network. The broadcast and communication converging unit may use the remaining frequency band as a channel for the data communication signals.

Preferably, the broadcast and communication converging unit includes a cable channel muldem for multiplexing and demultiplexing signals, a home area network (HAN) transceiver that connects broadcast terminals or communication terminals on the coaxial cable with the cable channel muldem, and a cable channel controller that controls the cable channel muldem and the HAN transceiver.

The cable channel controller may include a channel selector that selects a channel of a preselected frequency band through a filtering process of all the frequency bands of cable broadcast received from the external broadcast network. Further, the cable channel controller may include a channel processor that sets a channel to the preselected frequency band in the coaxial cable environment in home. Further, the cable channel controller may include a data networking processor that processes data networking signals between the cable channel muldem and the HAN transceiver. Further, the cable channel controller may include a cable band management unit that receives a channel setting information from the channel processor and allocates at least a portion of the remaining frequency bands to the cable channel muldem.

The broadcast processor may include a signal transceiver; and a receiving broadcast decoding and channel selection command unit that generates a channel selection command of a channel to be transmitted to and received from the signal transceiver and transmits the information on the channel selection to the channel selector. Further, the broadcast processor may include the broadcast channel receiving unit that sets the broadcast channel to be received according to the channel selection command. The broadcast processor may include a receiving channel transceiver that transmits a receiving channel information to the signal transceiver and the cable band management unit according to the channel selection command.

The data communication processor may include a signal transceiver that transmits and receives the communication signals or the data communication signals; and a data processor that processes data in the communication signals or data the data communication signals and transmits them to the cable channel muldem. Further, the data communication processor may include a transmitting and receiving frequency band management unit that exchanges information with the cable band management unit, determines the frequency band for the communication signals or the data communication signals, and sets the frequency for the signal transceiver to use. Further, the data communication processor may include a MAC packet processor that is connected between the data processor and the physical layer of the signal transceiver to process packets of a media access control (MAC) level under the management of the transmitting and receiving frequency band management unit.

Preferably, the occupied frequency band of the broadcast signal is 870 MHz or less, and the broadcast communication converging unit divides a frequency band of the broadcast signals into 6 MHz unit for each channel to manage.

According to another exemplary embodiment of the present invention, there is provided a method for converging broadcast and communication in a home in an apparatus for coaxial cable based broadcast and communication convergence in a home for supporting a frequency band less than a frequency band used in Multimedia over Coax Alliance (MoCA), including: transmitting and receiving broadcast signals from an external broadcast network; transmitting and receiving communication signals from an external communication network; being operated as a terminal for the broadcast signals and the communication signal input to a home, and dividing an occupied frequency band of the broadcast signal from a remaining frequency band, and using the remaining frequency band as a channel for the communication signals.

The method for converging broadcast and communication in a home may further include: transmitting and receiving data communication signals from an external data communication network; and using the remaining frequency band as a channel for the data communication signals.

The method for converging broadcast and communication in a home may further include multiplexing or demultiplexing the broadcast signal, the communication signal, the data communication signal, or a combination thereof.

The method for converging broadcast and communication in a home may further include selecting a preselected frequency band by filtering all frequency bands of the external broadcast network.

The method for converging broadcast and communication in home may further include: generating a channel selection command for a channel to be transmitted and received with respect to the communication signals or the data communication signals; and setting a channel to be transmitted or received according to the channel selection command in the remaining frequency band.

The method for converging broadcast and communication in a home may further include processing packets of a MAC level between a physical layer of the signal transceiver and data processor that processes data in the communication signals or the data communication signals.

According to the present invention, it can simultaneously receive the broadcast and communication using one physical medium installed in a home network to receive the existing broadcast, for example, the coaxial cable that does not support the frequency band of the MoCA.

Further, the present invention allocates only the broadcast channel actually used in home to receive broadcast and uses the non-allocated remaining channels as the data communication channel in the band of 870 MHz or less used as the broadcast channel in the existing coaxial cable in home, thereby making it possible to easily converge the broadcast and communication in home.

DETAILED DESCRIPTION OF THE PREFERRED EMBODIMENTS

Hereinafter, exemplary embodiments of the present invention will be described in detail with reference to the accompanying drawings and contents to be described below. Therefore, the present invention may be modified in many different forms and it should not be limited to the embodiments set forth herein. Rather, the exemplary embodiments set forth herein are provided to a person of ordinary skilled in the art to thoroughly and completely understand contents disclosed herein and fully provide the spirit of the present invention. Like reference numerals designate like components throughout the specification. Meanwhile, terms used in the present invention are to explain exemplary embodiments rather than limiting the present invention. In the specification, a singular type may also be used as a plural type unless stated specifically. "Comprises" and/or "comprising" used herein does not exclude the existence or addition of one or more other components, steps, operations and/or elements.

Figure 1:
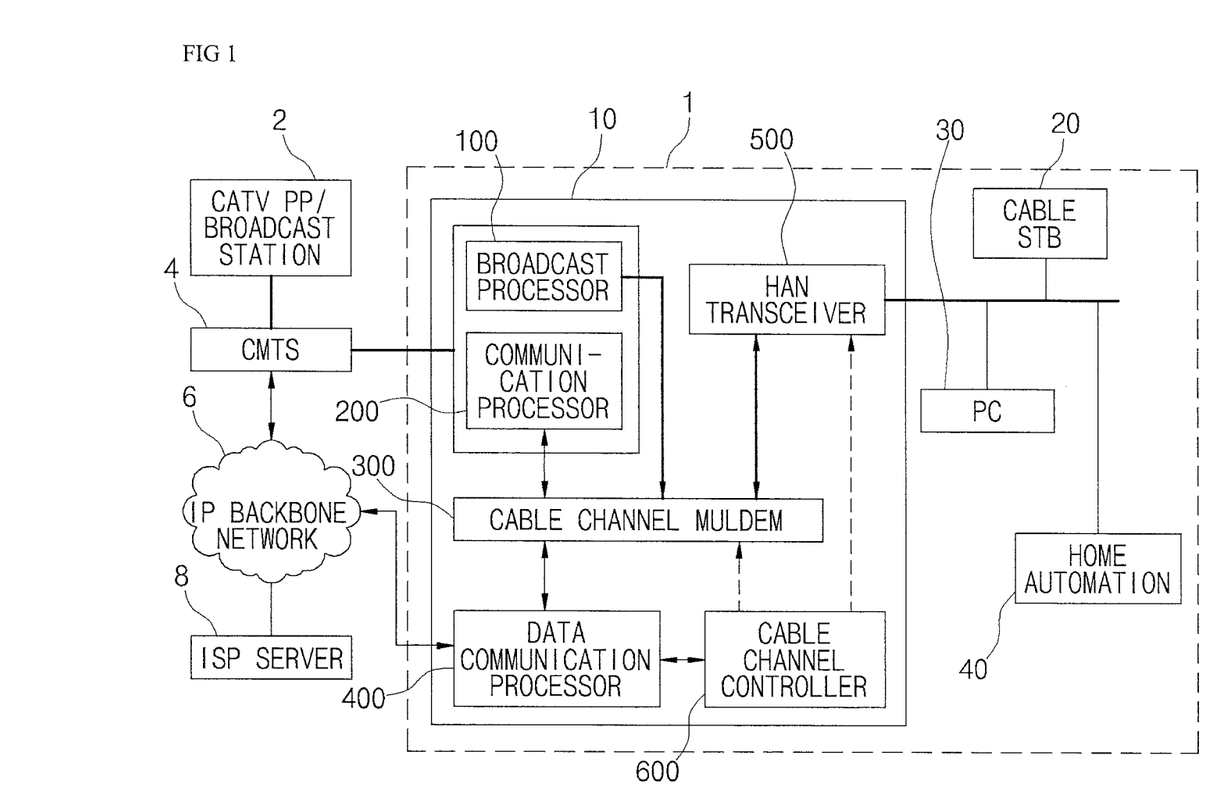
FIG. 1 is a schematic configuration diagram of a system for broadcast communication convergence using a apparatus for coaxial cable based broad and communication convergence in a home according to an exemplary embodiment of the present invention.

FIG. 1 is a schematic configuration diagram of the system for a broadcast and communication convergence using an apparatus for coaxial cable based broadcast and communication convergence in a home according to one exemplary embodiment of the present invention.

In other words, FIG. 1 is a diagram schematically showing functions of the apparatus for broadcast and communication convergence 10 in the system for broadcast and communication convergence according to the exemplary embodiment. In FIG. 1, all the home network service solutions such as a cable set-top box (STB) 20 for receiving a cable broadcast in a home 1, a computer 30 for communication, a home automation 40, an entertainment service, etc. are connected to an external broadcast network and an external communication network through the apparatus 10 for broadcast and communication convergence and the coaxial cable solution. The apparatus for broadcast and communication convergence according to the exemplary embodiment may be called a multi-function home gateway in the home 1.

The coaxial cable solution refers to the existing coaxial cable that does not support the frequency band used in a Multimedia over Coax Alliance (MoCA) technology. An external broadcast network includes a Community Antenna Television, Community Access Television, or Cable TV Program Provider (CATV PP), a broadcast station, etc., that are connected to the apparatus 10 for broadcast and communication convergence in the home 1 through a Cable Modem Terminating System (CMTS) 4. The communication network includes an internet service provider (ISP) 8, etc., that is connected to the apparatus 10 for broadcast and communication convergence in the home 1 through an Internet protocol (IP) backbone network 6 and the CMTS 4. The ISP 8 may be directly connected to a data communication processor 400 of the apparatus 10 for broadcast and communication convergence in the home 1 through the IP backbone network 6.

The apparatus 10 for broadcast and communication convergence according to the exemplary embodiment includes a broadcast processor 100, a communication processor 200, a cable channel muldem 300, a data communication processor 400, a home area network (HAN) transceiver 500, and a cable channel controller 600.

The broadcast processor 100 and the communication processor 200 include a cable solution that processes the external broadcast and communication signals in the coaxial cable scheme.

The data communication processor 400 includes a network connection function and a data communication gateway that processes the data communication signal between the home 1 and the outside.

The cable channel muldem 300 is connected to the broadcast processor 100, the communication processor 200, and the data communication processor 400, respectively. In the specification, the cable channel muldem 300 refers to a cable channel mux/demux or a configuration unit including it.

A HAN transceiver 500 connects the cable channel muldem 300 to the cable STB 20, a personal computer 30, and a home automation 40 in the home 1.

The cable channel controller 600 controls the operation of the cable channel muldem 300 and the HAN transceiver 500 to perform the external network connection function and perform the convergence function of the coaxial cable based broadcast and communication in the home 1. The cable channel controller 600 may be directly connected with the data communication processor 400.

The apparatus 10 for broad and communication convergence according to the exemplary embodiment terminates the broadcast signals input through all the broadcast frequency bands from the outside in order to converge the broadcast and communication using the coaxial cable in the home 1 and transmits the terminated broadcast signals of the frequency band of a channel required only for broadcast receiving in home as the broadcast signals in the coaxial cable in the home 1 to the coaxial cable network in the home 1.

In this configuration, the apparatus for broadcast and communication convergence 10 according to the exemplary embodiment is managed in the cable channel controller 600 to use only the frequency band actually used for the specific broadcast signals to transmit the broadcast signals to the home 1 only in the broadcast frequency band to be actually viewed by the user among all the broadcast bands and may use the unused, empty remaining frequency bands as the frequency band for the data communication in the home 1.

In the apparatus 10 for broadcast and communication convergence, the broadcast processor 100 and the communication processor 200 may be implemented to use an apparatus for supporting the existing cable based broadcast signals and the cable based data communication services, for example, a data over cable service interface specification (DOCSIS) modem as it is. Further, in the apparatus for broadcast and communication convergence 10, the data communication processor 400 may be implemented to use the function of the data communication home gateway of general communication type including an optical LAN and an xDSL modem, an Ethernet external network connection function, etc., as it is.

Figure 2:
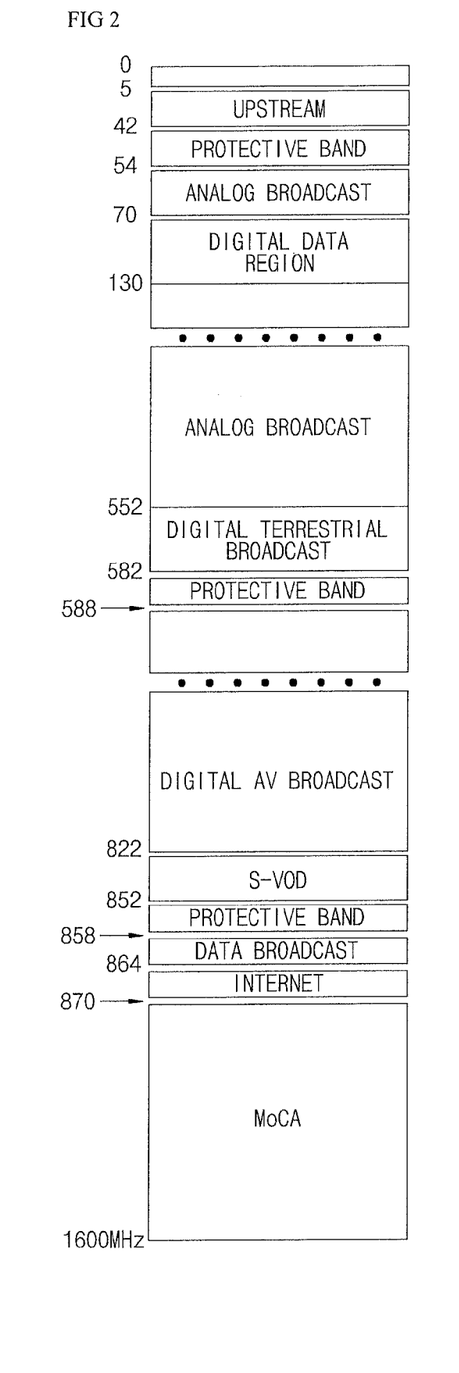
FIG. 2 is a diagrams showing a frequency band allocated to a coaxial cable.

FIG. 2 is a diagram showing a frequency band allocated to the coaxial cable connected between the home and the external network. In other words, FIG. 2 shows a frequency allocation history for each allocated region currently used in the coaxial cable.

Referring to FIG. 2, the apparatus for broadcast and communication convergence is installed in a home environment such as the existing apartment and is a solution for converging broadcast and communication in the coaxial cable environment that cannot support the broadcast and communication convergence solution using the frequency band of 870 MHz or more.

The apparatus for broadcast and communication convergence according to the exemplary embodiment includes the multi-function home gateway and subdivides the management unit into a 6 MHz band used for each broadcast channel to perform the management function for the channel band. According to the management type, the broadcast and communication convergence in a home can be achieved by the existing coaxial cable that does not support the frequency band used in the MoCA technology.

Hereinafter, the apparatus for broadcast and communication convergence will be described in more detail.

Figure 3:
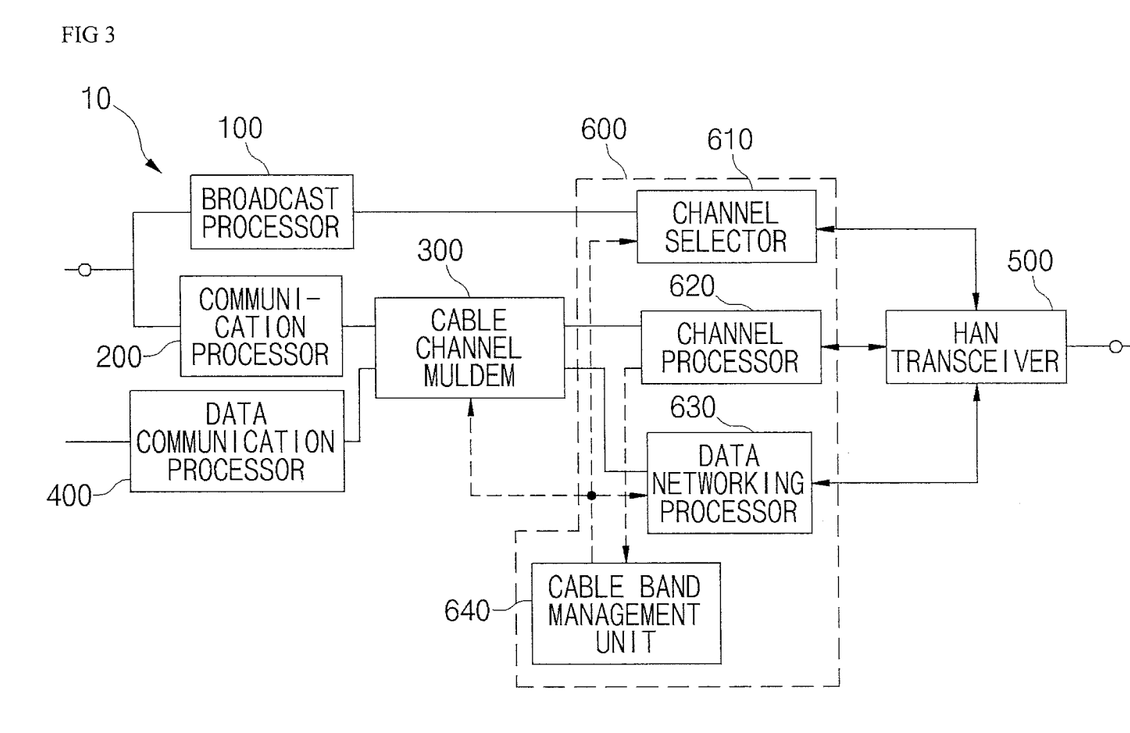
FIG. 3 is a detailed block diagram showing the apparatus for broadcast and communication convergence in home of FIG. 1.

FIG. 3 is a detailed block diagram showing the apparatus for broadcast and communication convergence in a home of FIG. 1.

Referring to FIG. 3, the apparatus 10 for broadcast and communication convergence includes the broadcast processor 100, the communication processor 200, the cable channel muldem 300, the data communication processor 400, the HAN transceiver 500, and the cable channel controller 600. The cable channel processor 600 includes a channel selector 610, a channel processor 620, a data networking processor 630, and a cable band management unit 640.

In the apparatus 10 for broadcast and communication convergence according to the exemplary embodiment, the cable channel muldem 300, the HAN transceiver 500, and the cable channel controller 600 are operated as the broadcast and communication converging unit for the broadcast processor 100 and the communication processor 200 and as the broadcast and communication converging unit for the broadcast processor 100, the communication processor 200, and the data communication processor 400.

Allocation of Available Frequency Band

The frequency band allocation of all the broadcast and communication frequency in a home is managed by the control of the cable band management unit 640.

Common Frequency Band for Management and Control

The cable band management unit 640 manages the frequency band in the cable based broadcast and communication convergence environment in a home by communicating with the receiving channel transmitter (see 140 of FIG. 4) included in the cable broadcast STB for receiving the broadcast services or the TV tuner and the transmitting and receiving frequency band management unit (see 420 of FIG. 5) included in the communication interface of the data communication system. The common frequency band of the frequency band management concept may be commonly used by all the systems in a home when initializing the system or by selecting the specific channel.

Use of Data Communication Channel

The cable band management unit 640 can perform the coaxial cable based data communication function in a home by using the remaining channels other than the previously input TV receiving channel in the available channels of the coaxial cable in a home if the broadcast channel that the user wants to receive is input through the receiving channel transmitter (see 140 of FIG. 4) included in the cable broadcast STB or the TV broadcast tuner.

Operation in the Apparatus for Broadcast and Communication Convergence

If the broadcast channel that the user wants to receive from the broadcast receiving channel transmitter (see 140 of FIG. 4) is input, the cable band management unit 640 informs a Net-broadcast channel selector 610 of the corresponding channels. The channel selector 610 transmits only the preselected channel undertaking the filtering process of all the bands of the cable broadcast received through the broadcast channel receiver 120 to the cable network in a home via the cable network signal transceiver 110.

The always-operated channel processor 620 is a functional block that processes the signals of the frequency band for control and management in the above-mentioned cable environment in home. The management and control for the frequency band in the entire cable environment in a home are performed through the frequency band controlled and managed in the channel processor 620. The channel processing results processed in the channel processor 620 are transmitted to the cable band management unit 640.

The data communication between the data communication apparatus in the external network and the data communication apparatus in a home that are connected through the communication processor 200 and the data communication processor 400 is performed by the function of the cable channel muldem 300 by being allocated with the frequency band from the cable band management unit 640 under the cable environment other than the currently used broadcast receiving channel in home. The cable channel muldem 300 includes a mux/demux function and a switching function.

In addition, the data communication is performed by associating the cable channel muldem 300 with a data networking processor 630 as shown in FIG. 3. In other words, the data networking processor 630 is disposed between the cable channel muldem 300 and the HAN transceiver 500 to process the data networking signal therebetween and is operated by being associated with the cable band management unit 640, the cable channel muldem 300, and the channel selector 610.

Figure 4:
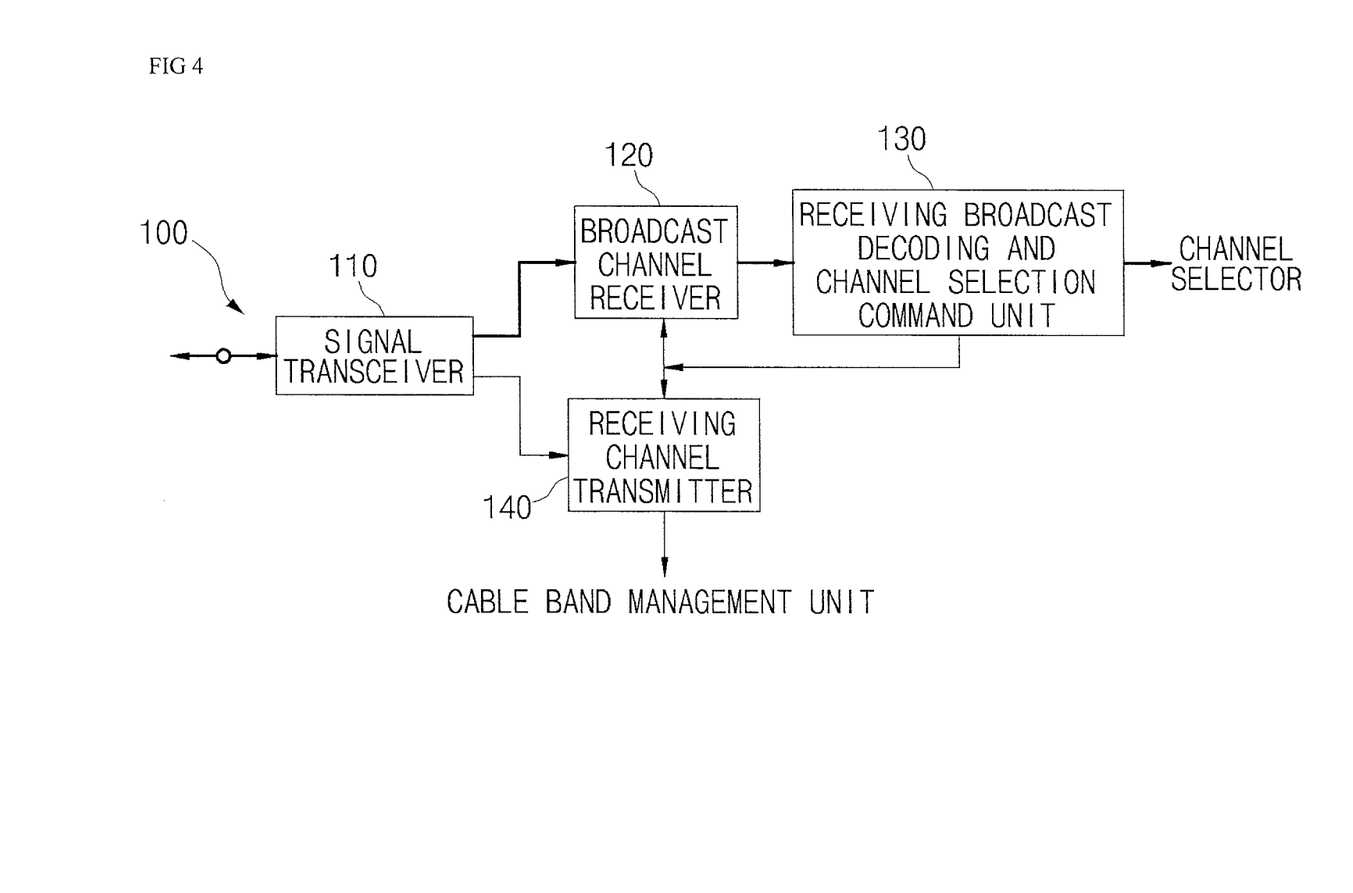
FIG. 4 is a detailed block diagram showing in detail a broadcast processor of the apparatus for broadcast and communication convergence in home of FIG. 1.

FIG. 4 is a detailed block diagram showing the broadcast processor of the apparatus for broadcast and communication convergence in a home of FIG. 1.

Referring to FIG. 4, the broadcast processor 100 includes the signal transceiver 110, the broadcast channel receiver 120, the receiving broadcast decoding and channel selection command unit 130, and the receiving channel transmitter 140. Each component of the broadcast processor 100 may be implemented as a functional block.

The signal transceiver 110 is a functional block for performing the bi-directional communication. The function of the signal transceiver may be compared with the uni-directional receiving function of the existing broadcast signal transceiver.

The broadcast channel receiver 120 is a functional block that performs substantially the same function as the existing broadcast tuner. The broadcast channel receiver 120 sets the broadcast channels to be received according to the channel selection command in the upper-level receiving broadcast decoding and channel selection command unit 130. The user receives the desired broadcast by the above operations.

At this time, the cable band management unit (see 640 of FIG. 3) receives the signals for setting the channels from the receiving channel transmitter 140 and determines the channel setting to transmit the information on the changed channel or the information on the newly set broadcast use channel.

The method for transmitting the TV receiving channel according to the exemplary embodiment will be described briefly.

The receiving channel transmitter 140 is configured to capture the broadcast receiving channel selection commands to the tuner from the receiving broadcast decoding and the channel selection command unit 130 when the user selects the broadcast channels to be received by a remote controller or TV buttons in order to receive TV broadcast and provide the information on the corresponding channel selection to the program provider of the cable TV through the above-mentioned common management channel.

The common management channel refers to the frequency band of the unused channel, that is, the empty channel other than the frequency bands of the using broadcast channel.

Figure 5:
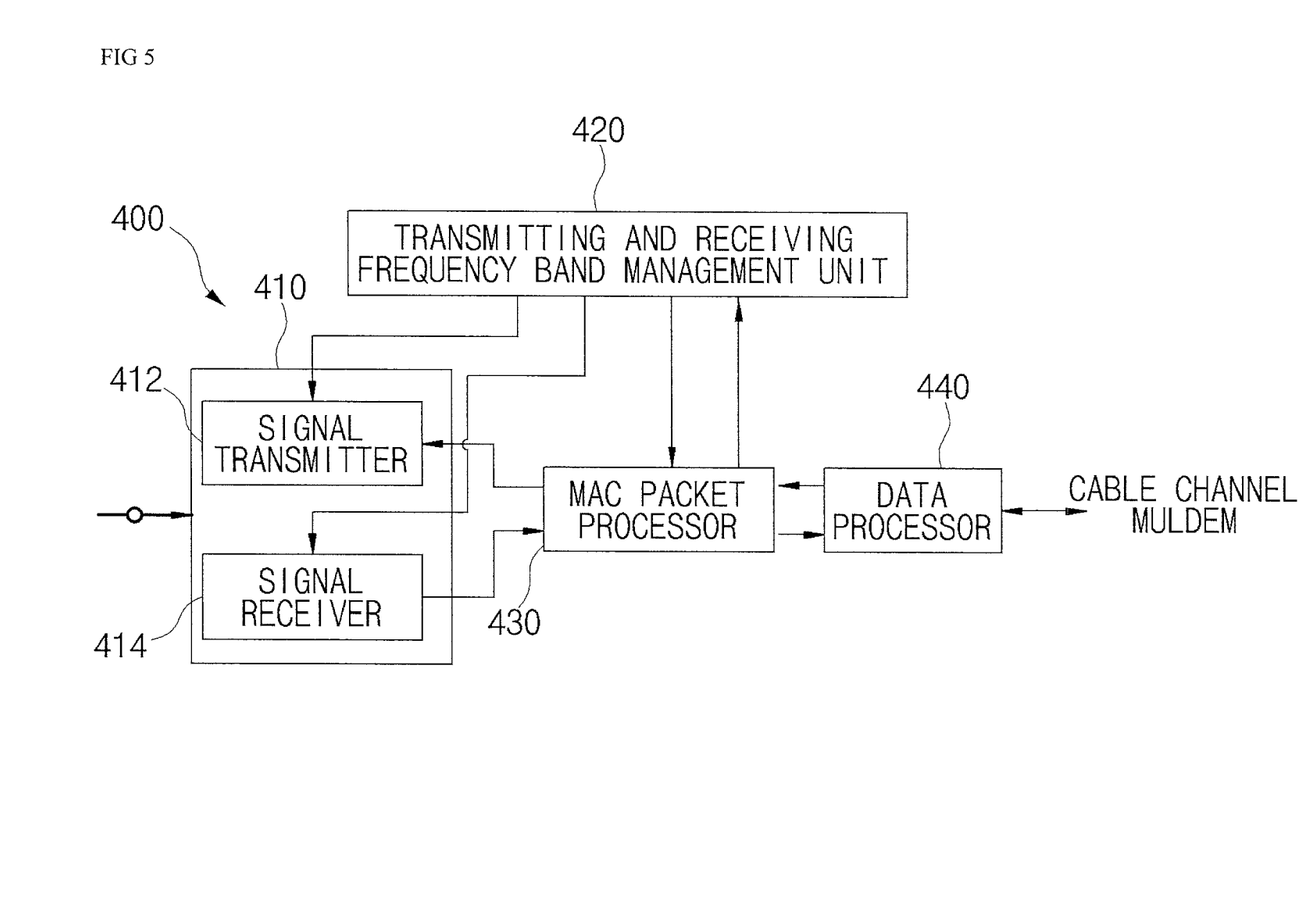
FIG. 5 is a detailed block diagram showing in detail a communication processor of the apparatus for broadcast and communication convergence in a home of FIG. 1.

FIG. 5 is a detailed block diagram showing the data communication processor of the apparatus for broadcast and communication convergence in a home of FIG. 1.

Referring to FIG. 5, the communication interface module configuration of the data communication processor 400 according to an exemplary embodiment of the present invention includes a signal transceiver 410, a transmitting and receiving frequency band management unit 420, a media access control (MAC) packet processor 430, and a data processor 440. The signal transceiver 410 includes a signal transmitter 412 and a signal receiver 414.

The transmitting and receiving frequency band management unit 420 determines the frequency band for communication used in the corresponding apparatus by exchanging information with the cable band management unit (see 640 of FIG. 3) of the apparatus for broadcast and communication convergence and sets the used frequency of the signal transmitter 412 and the signal receiver 414 using the determined frequency band, thereby transmitting and receiving data between the external data communication network and the home.

The MAC packet processor 430 is connected to the physical layer and the upper transmitting and receiving frequency band management unit 420 and the data processor 440, thereby serving to process the packet at the MAC level.

Operational Sequence of Data Communication and Channel Change and Setting

Figure 6:
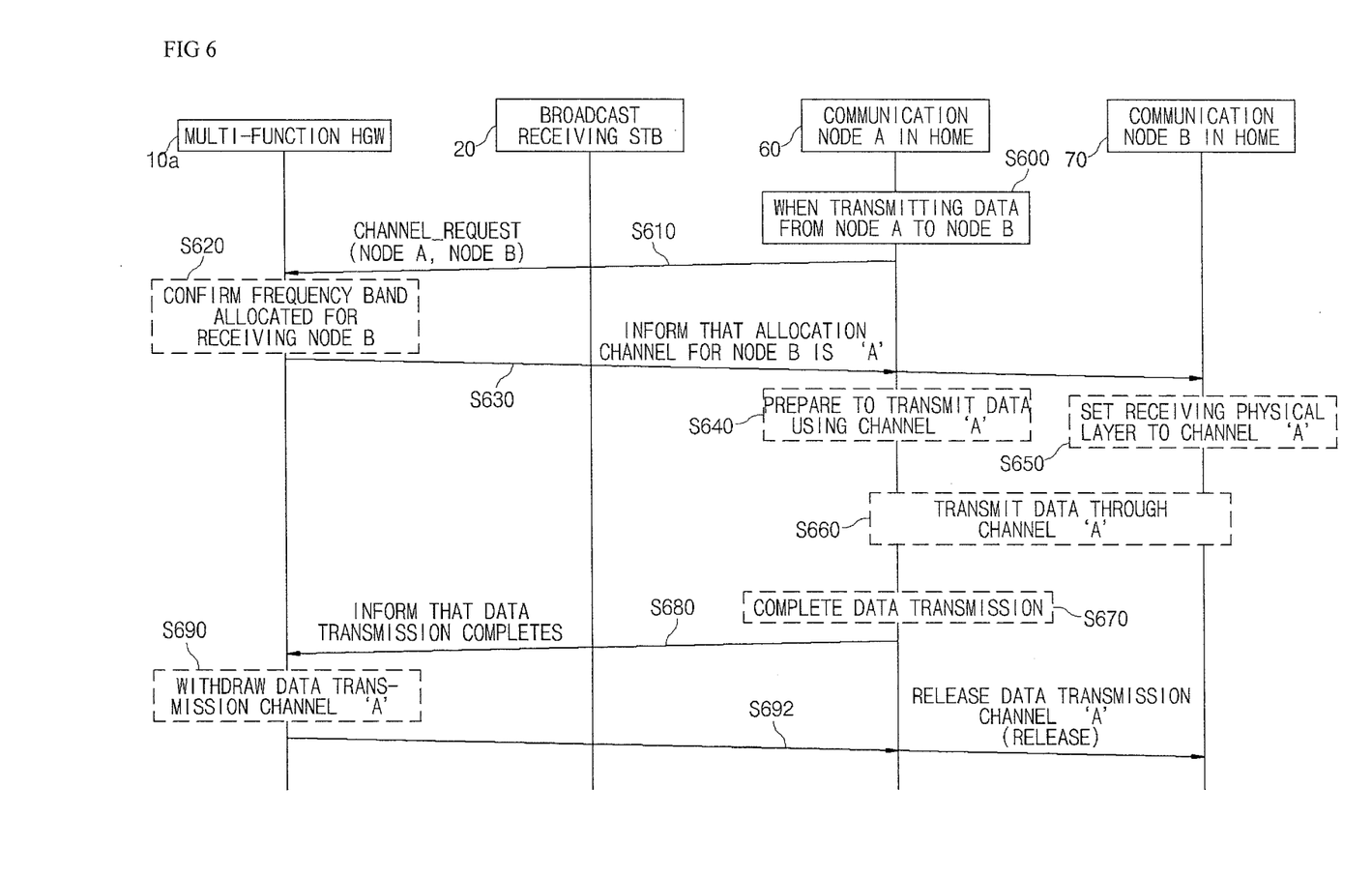
FIG. 6 is a signal flow chart showing a data transmission process from a node A to a node B through the new channel setting of the apparatus for broadcast and communication convergence in a home of FIG. 1.

FIG. 6 is a signal flow chart showing a data transmission process from node A to node B through the new channel setting of the apparatus for broadcast and communication convergence in a home of FIG. 1.

Referring to FIG. 6, in order to transmit data from the communication node A in a home (hereinafter, referred to as node A) 60 to the communication node B in a home (hereinafter, referred to as node B) 70, the data transmission channel received in node B 70, that is, the frequency band is allocated and the data transmission between node A 60 and node B 70 should be made through the allocated channel (S600).

To this end, the channel allocation is requested to the multi-function home gateway 10a (hereinafter, referred to as home gateway) as the apparatus for broadcast and communication convergence that serves as a coordinator in the coaxial cable transmission network at the node A 60 first transmitting data in order to transmit data from node A 60 to node B 70 (S610). The request signal for channel allocation may include, for example, a channel_request (node A, node B) type.

Next, it is confirmed whether there is an already allocated band for the receiving node B 70 at the home gateway 10a (S620). If it is determined that there is no allocated frequency band, it is informed that a new channel is allocated to the transmitting node A 60 and the receiving node B 70 through the newly allocated frequency band (S630). The new channel is denoted by channel 'A'.

Next, node A 60 allocated with the data transmission channel 'A' to node B 70 prepares to transmit data to the receiving node B 70 through the allocated channel 'A' (S640). The receiving node B 70 confirms that the channel allocated for receiving is channel 'A' and the receiving physical layer is set as the channel 'A' (S650). The receiving node B 70 uses the filtering function of the corresponding physical layer to receive the signal received thereto (S660).

Next, if node A 60 completes the transmission of the data to be transmitted to node B 70, it informs the home gateway 10a serving as the coordinator that data transmission is complete (S680).

Next, the home gateway 10a withdraws the data transmission channel 'A' (S690). The home gateway 10a informs node A 60 and node B 70 that the data transmission channel 'A' is released (S692).

Figure 7:
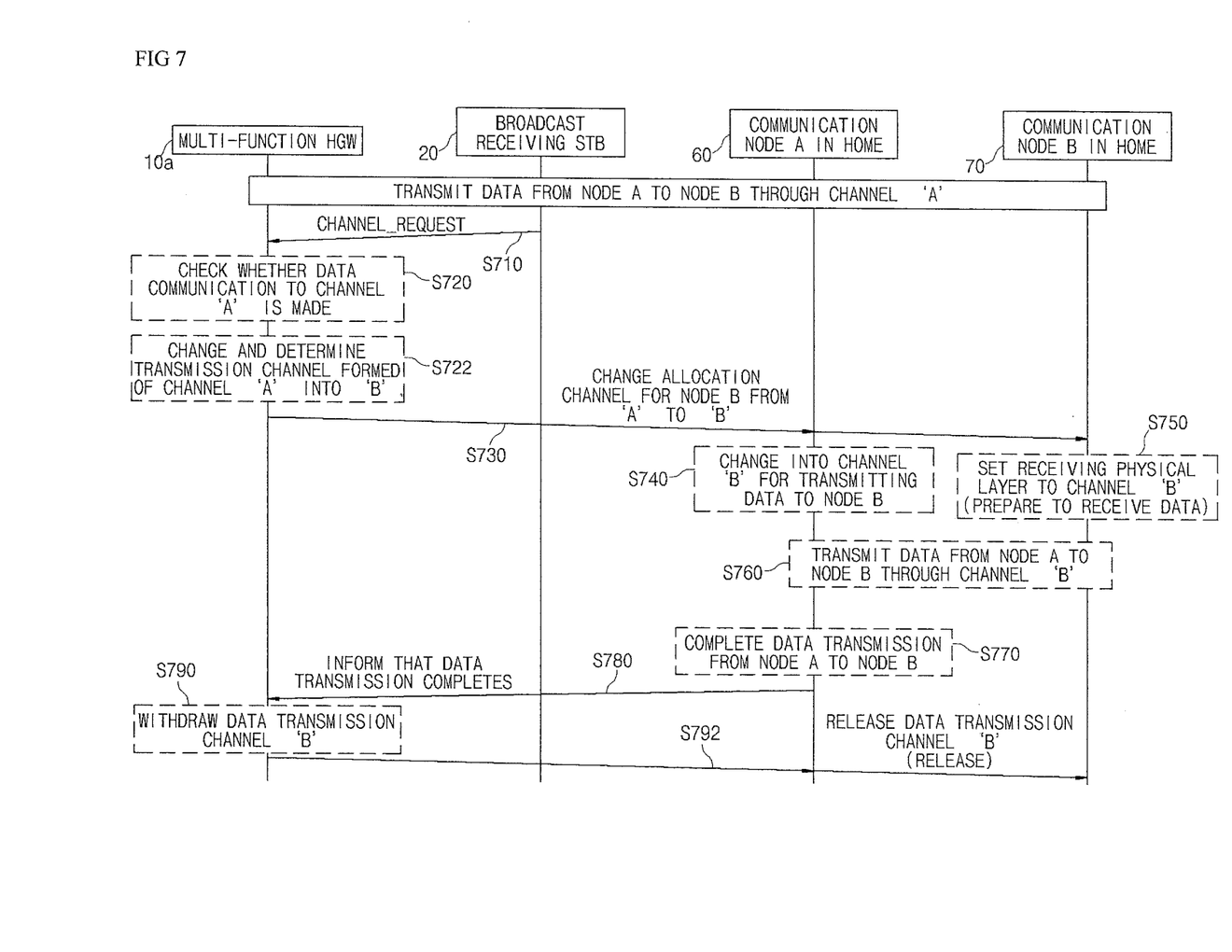
FIG. 7 is a signal flow chart showing a channel changing process for TV receiving request to the corresponding channel during the data communication of the apparatus for broadcast and communication convergence in a home of FIG. 1.

Operation Sequence of TV Broadcast Receiving Request to Corresponding Channel During Data Communication FIG. 7 is a signal flow chart showing a channel changing process for a TV receiving request to the corresponding channel during the data communication of the apparatus for broadcast and communication convergence in home of FIG. 1.

Referring to FIG. 7, it requests the TV broadcast receiving to the data transmission channel 'A' between node A 60 and node B 70 from the TV receiving node while the data transmission from node 60 to node B 70 is made (S700). Then, the broadcast receiving STB (hereinafter, referred to as STB) 20 requests the channel change to the home gateway 10a (S710). The request signal for channel change may include, for example, a channel_request (STB, A) type.

Next, if the channel changing request signal is input from the STB 20, the home gateway 10a serving as the coordinator checks whether the corresponding channel 'A' is currently used to transmit the data (S720).

Next, the home gateway 10a confirms that the data transmission between node A 60 and node B 70 is made through the corresponding channel 'A' and then determines that the transmission channel is changed into channel 'B' (S722). The home gateway 10a informs node A 60 and node B 70 that the data transmission channel is changed from the channel 'A' to the channel 'B' (S730).

As a result, node A 60 prepares to change and transmit the transmission frequency band, that is, a channel from 'A' to 'B' (S740). Node B 70 prepares to receive data by changing the receiving channel from 'A' to 'B' (S750). If the transmission preparation at node A 60 and the receiving preparation at node B 70 complete, the data transmission from node A 60 to node B through the channel 'A' is continuously made through the channel 'B' (S760).

Next, if the data transmission completes, node A 60 informs the home gateway 10a that the data transmission is completed (S790).

Next, the home gateway 10a withdraws the data transmission channel 'B' (S790). The home gateway 10a informs node A 60 and node B 70 that the data transmission channel 'B' is released (S792).

The exemplary embodiments of the present invention are disclosed with reference to the detailed description and the drawings. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus for coaxial cable based broad and communication convergence in a home for supporting a frequency band less than a frequency band used in Multimedia over Coax Alliance (MoCA), comprising:
    a broadcast processor that transmits and receives broadcast signals from an external broadcasting network;
    a communication processor that transmits and receives communication signals from an external communication network;
    and a broadcast and communication converging unit that is operated as a terminal for the broadcast signals input to the broadcast processor and the communication signals input to the communication processor, and divides an occupied frequency band of the broadcast signal from a remaining frequency band, and uses the remaining frequency band as a channel for the communication signals;
    a data communication processor that transmits and receives data communication signals from an external data communication network, and
    wherein the broadcast and communication converging unit uses the remaining frequency band as a channel for the data communication signals,
    wherein the broadcast and communication converging unit includes a cable channel muldem for multiplexing and demultiplexing signals, a home area network (HAN) transceiver that connects broadcast terminals or communication terminals on the coaxial cable with the cable channel muldem, and a cable channel controller that controls the cable channel muldem and the HAN transceiver.

2. The apparatus of claim 1, wherein the cable channel controller includes a channel selector that selects a channel of a preselected frequency band through a filtering process of all frequency bands of cable broadcast received from the external broadcast network.

3. The apparatus of claim 2, wherein the cable channel controller includes a channel processor that sets a channel to the preselected frequency band in the coaxial cable environment in home.

4. The apparatus of claim 3, wherein the cable channel controller includes a data networking processor that processes data networking signals between the cable channel muldem and the HAN transceiver.

5. The apparatus of claim 4, wherein the cable channel controller includes a cable band management unit that receives a channel setting information from the channel processor and allocates at least a portion of the remaining frequency bands to the cable channel muldem.

6. The apparatus of claim 5, wherein the broadcast processor includes:
    a signal transceiver; and
    a receiving broadcast decoding and channel selection command unit that generates a channel selection command of a channel to be transmitted to and received from the signal transceiver and transmits the information on the channel selection to the channel selector.

7. The apparatus of claim 6, wherein the broadcast processor includes the broadcast channel receiving unit that sets the broadcast channel to be received according to the channel selection command.

8. The apparatus of claim 7, wherein the broadcast processor includes a receiving channel transceiver that transmits a receiving channel information to the signal transceiver and the cable band management unit according to the channel selection command.

9. The apparatus of claim 2, wherein the data communication processor includes:
a signal transceiver that transmits and receives the communication signals or the data communication signals; and
a data processor that processes data in the communication signals or the data communication signals and transmits them to the cable channel muldem.

10. The apparatus of claim 9, wherein the data communication processor includes a transmitting and receiving frequency band management unit that exchanges information with the cable band management unit, determines the frequency band for the communication signals or the data communication signals, and sets the frequency for the signal transceiver to use.

11. The apparatus of claim 10, wherein the data communication processor includes a MAC packet processor that is connected between the data processor and the physical layer of the signal transceiver to process packets of a media access control (MAC) level under the management of the transmitting and receiving frequency band management unit.

12. A method for converging broadcast and communication in a home in an apparatus for coaxial cable based broadcast and communication convergence in a home for supporting a frequency band less than a frequency band used in Multimedia over Coax Alliance (MoCA), comprising:
transmitting and receiving broadcast signals from an external broadcast network;
transmitting and receiving communication signals from an external communication network;
being operated as a terminal for the broadcast signals and the communication signal input to the home, and dividing an occupied frequency band of the broadcast signal from a remaining frequency band; and
using the remaining frequency band as a channel for the communication signals,
transmitting and receiving data communication signals from an external data communication network; and
using the remaining frequency band as a channel for the data communication signals,
multiplexing or demultiplexing the broadcast signal, the communication signal, the data communication signal, or a combination thereof,
selecting a preselected frequency band by filtering all frequency bands of the external broadcast network;
generating a channel selection command for a channel to be transmitted and received with respect to the communication signals or the data communication signals; and
setting a channel to be transmitted or received according to the channel selection command in the remaining frequency band.

13. The method of claim 12, further comprising processing packets of a MAC level between a physical layer of the signal transceiver and the data processor that processes data in the communication signals or the data communication signals.

* * * * *